United States Patent
Biswas et al.

(10) Patent No.: US 9,996,817 B2
(45) Date of Patent: Jun. 12, 2018

(54) MANAGING REQUESTS FOR IN-PERSON TRANSACTIONS

(71) Applicant: Accenture Global Services Limited, Dublin (IE)

(72) Inventors: Adrija Biswas, Bexleyheath (GB); David De Niese, Milton Keynes (GB)

(73) Assignee: Accenture Global Services Limited, Dublin (IE)

( * ) Notice: Subject to any disclaimer, the term of this patent is extended or adjusted under 35 U.S.C. 154(b) by 357 days.

(21) Appl. No.: 14/838,516

(22) Filed: Aug. 28, 2015

(65) Prior Publication Data

US 2016/0063431 A1    Mar. 3, 2016

Related U.S. Application Data

(60) Provisional application No. 62/044,119, filed on Aug. 29, 2014.

(51) Int. Cl.
| | | |
|---|---|---|
| *G06Q 10/00* | (2012.01) | |
| *G06Q 10/08* | (2012.01) | |

(52) U.S. Cl.
CPC ....... *G06Q 10/087* (2013.01); *G06Q 10/0875* (2013.01)

(58) Field of Classification Search
CPC .................. G06Q 10/087; G06Q 10/0875
USPC ................................. 705/28, 26.1
See application file for complete search history.

(56) References Cited

U.S. PATENT DOCUMENTS

| | | | | |
|---|---|---|---|---|
| 5,950,169 | A * | 9/1999 | Borghesi | G06Q 30/0283 |
| | | | | 705/4 |
| 6,732,417 | B2 * | 5/2004 | Kaburagi | G06Q 10/04 |
| | | | | 29/407.01 |
| 9,595,019 | B1 * | 3/2017 | Marlow | G06Q 10/087 |
| 2009/0138383 | A1 | 5/2009 | Alba et al. | |
| 2009/0265251 | A1 | 10/2009 | Dunlap et al. | |
| 2014/0214673 | A1 * | 7/2014 | Baca | G06O 20/40145 |
| | | | | 705/44 |

(Continued)

OTHER PUBLICATIONS

Extended European Search Report in Application No. 15182950.4, dated Dec. 22, 2015, 7 pages.

(Continued)

*Primary Examiner* — Rokib Masud
(74) *Attorney, Agent, or Firm* — Fish & Richardson P.C.

(57) ABSTRACT

Methods, systems, and apparatus, including computer programs encoded on a computer storage medium, are described that receive, from a device, a request to obtain an amount of physical items from an account, the account defining a total quantity of the physical items able to be obtained from the account, and the account being maintained across multiple locations at which the physical items are stored. The request is transmitted to at least one computer that manages inventory of the physical items for at least one of the multiple locations. Inventory availability information is received from the at least one computer that manages inventory of the physical items, including information regarding availability of the amount of physical items, and availability of a combination of differently-sized subunits of physical items that satisfy the requested amount. The inventory availability information is then transmitted to the device.

22 Claims, 14 Drawing Sheets

(56) References Cited

U.S. PATENT DOCUMENTS

2015/0127437 A1* 5/2015 Chantry ............ G06Q 30/0214
              705/14.16

OTHER PUBLICATIONS

European Search Report in Application No. 15182950.4, dated Apr. 23, 2018, 6 pages.

* cited by examiner

MANAGING REQUESTS FOR IN-PERSON TRANSACTIONS

CROSS-REFERENCE TO RELATED APPLICATION

This application claims priority from U.S. Provisional Application No. 62/044,119, filed Aug. 29, 2014, and titled "Managing Requests for In-Person Transactions," which is incorporated by reference.

TECHNICAL FIELD

This specification generally describes systems and processes for managing requests for conducting in-person transactions at a physical location.

BACKGROUND

Various institutions provide physical locations that provide in-person service to its customers. For example, a commercial institution can provide one or more physical branch locations that customers can visit to perform in-person transactions, such as requesting physical items from an account associated with the customer.

SUMMARY

In general, innovative aspects of the subject matter described in this specification may be embodied in methods that include actions of receiving, from a device, a request to obtain an amount of physical items from an account, the account defining a total quantity of the physical items able to be obtained from the account, and the account being maintained across multiple locations at which the physical items are stored; based on receiving the request: transmitting, to at least one computer that manages inventory of the physical items for at least one of the multiple locations, the request to obtain the amount of physical items from the account, and receiving, from the at least one computer that manages inventory of the physical items for at least one of the multiple locations and in response to transmitting the request, inventory availability information regarding: availability, at one or more of the multiple locations, of the amount of physical items, and availability, at each of the one or more of the multiple locations, of a combination of differently-sized subunits of physical items that satisfy the requested amount; based on determining that the amount of physical items is available at one or more of the multiple locations, transmitting, to the device, the inventory availability information.

These and other implementations may each optionally include one or more of the following features.

In some implementations, the request received from the device further specifies that the amount of physical items is to be obtained from the account in the combination of differently-sized subunits of physical items.

In some implementations, a method may also include transmitting, to the device, a graphical user interface that allows selection of the combination of differently-sized subunits of physical items that satisfy the requested amount; and based on a user's interaction with the graphical user interface, determining the combination of differently-sized subunits of physical items that satisfy the requested amount.

In some implementations, a method may also include, based on determining that the amount of physical items is available at one or more of the multiple locations, determining authorization information that can be verified at the one or more of the multiple locations to authorize obtaining the amount of physical items from the account; and transmitting the authorization information to at least one of the device or the at least one computer that manages inventory of the physical items for at least one of the multiple locations.

In some implementations, a method may also include receiving the authorization information from the at least one computer that manages inventory of the physical items for at least one of the multiple locations; and transmitting the received authorization information to the device.

In some implementations, a method may also include receiving the authorization information from the device; and transmitting the received authorization information to the at least one computer that manages inventory of the physical items for at least one of the multiple locations.

In some implementations, a method may also include generating the authorization information; and transmitting the generated authorization information to both the device and the at least one computer that manages inventory of the physical items for at least one of the multiple locations.

In some implementations, the authorization information may include a fingerprint scan.

In some implementations, the authorization information includes a personal identification number (PIN).

In some implementations, a method may also include transmitting, to the device, a map-based graphical user interface that displays at least the one or more of the multiple locations at which the amount of physical items is available, and receiving, from the device, a selection of a particular location at which obtaining the amount of physical items is requested.

In some implementations, the request further includes a specified time at which the amount of physical items is to be obtained from the account.

In some implementations, transmitting, to the at least one computer that manages inventory of the physical items for the at least one of the multiple locations, the request to obtain the amount of physical items from the account includes transmitting, to the at least one computer and using an application programming interface, a message that complies with a communication protocol.

In some implementations, a method also includes storing the received request in a memory device; and updating the stored request based on the inventory availability information received from the at least one computer that manages inventory of the physical items for at least one of the multiple locations.

In some implementations, receiving, from the at least one computer that manages inventory of the physical items for at least one of the multiple locations and in response to transmitting the request, inventory availability information includes receiving, from the at least one computer, a time at which the amount of physical items will be available at the one or more of the multiple locations.

In some implementations, transmitting, to the device, the inventory availability information includes transmitting, to the device, at least one of a text message, an email, or a pop-up display that includes the inventory availability information.

In some implementations, a method also includes, based on determining that the amount of physical items is not available at the one or more of the multiple locations, transmitting, to the device, an indication that the request cannot be fulfilled at the one or more of the multiple locations.

In some implementations, a method also includes receiving a list of people who are authorized to obtain the amount of physical items from the account; and based on the list of people, determining that the request specifies a person who is authorized to obtain the amount of physical items from the account.

In some implementations, a method also includes transmitting, to an authorized supervisor, a confirmation of approval for the request to obtain the amount of physical currency from the account.

In some implementations, a method also includes detecting that the request to obtain the amount of physical items from the account indicates unusual activity; and sending alert information regarding the detected unusual activity to at least one of the authorized supervisor or the at least one computer that manages inventory of the physical items for at least one of the multiple locations.

In some implementations, detecting that the request to obtain the amount of physical items from the account indicates unusual activity includes accessing one or more rules that have been specified for authorized obtainment of physical items from the account.

Other implementations of these aspects include corresponding systems, apparatus, and computer programs, configured to perform the actions of the methods, encoded on computer storage devices.

The details of one or more implementations of the subject matter described in this specification are set forth in the accompanying drawings, and the description, below. Other features, aspects and advantages of the subject matter will be apparent from the description and drawings, and from the claims.

Figure 1:
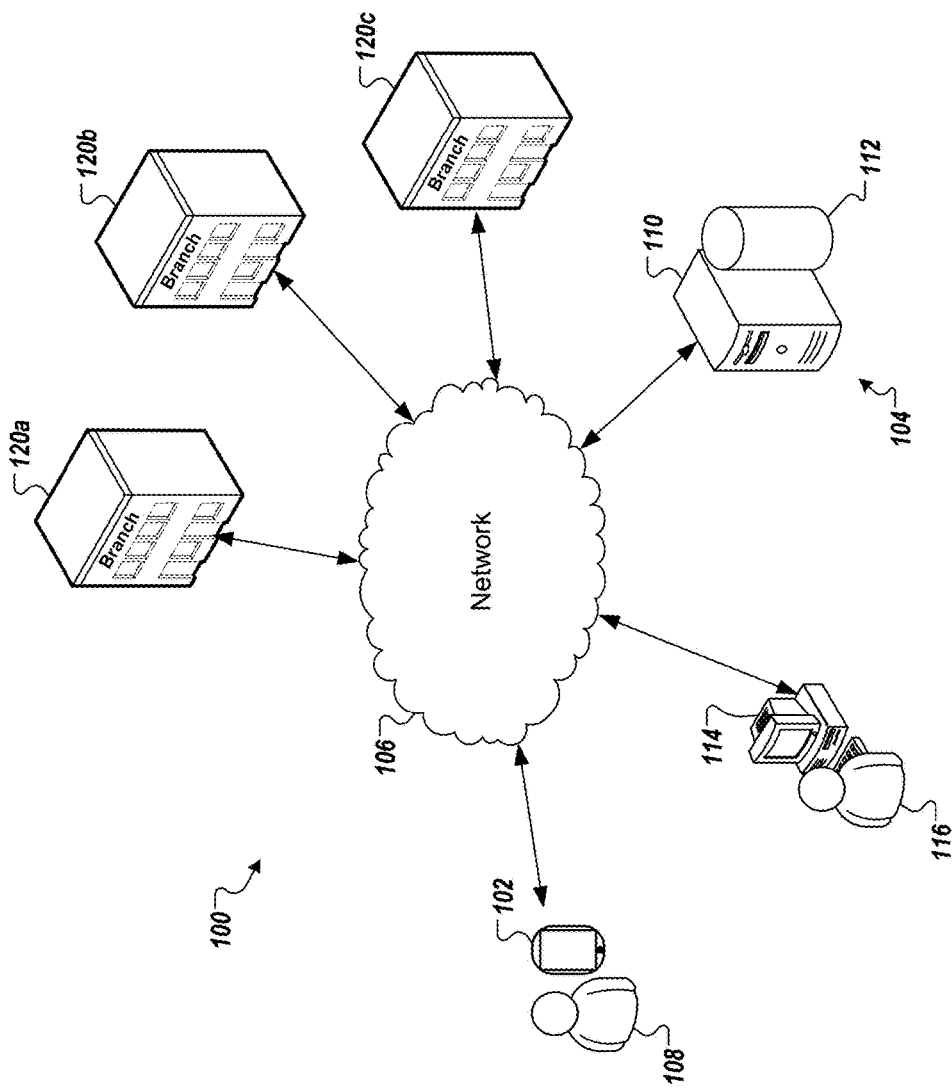
FIG. 1 is a block diagram illustrating an example of a system that can execute implementations of the present disclosure.

In the following text, a detailed description of examples will be given with reference to the drawings. It should be understood that various modifications to the examples may be made. In particular, elements of one example may be combined and used in other examples to form new examples. Like reference symbols in the various drawings indicate like elements.

DETAILED DESCRIPTION

Systems and techniques are disclosed that enable forecasting the amounts and types of physical items that will be collected by a user from an account associated with the user at a particular place at a particular time. In some scenarios, physical items associated with a user's account may be maintained at different physical locations, and the user may have the option of collecting physical items from the user's account at a particular one of those physical locations. Systems and techniques disclosed herein may enable forecasting a user's in-person collection of physical items from the user's account at a particular physical location.

Such techniques may improve efficiency and conserve resources in systems that maintain distributed inventories of physical items at multiple locations. For example, techniques disclosed herein may better ensure that sufficient physical items are available at a particular physical location in which the user is forecasted to collect the physical items, while reducing inefficiencies associated with multiple physical locations carrying an unnecessary surplus of physical items. For example, such techniques may better ensure that inventories at multiple physical locations are sufficient to meet expected user demands, and therefore the overall resources at those locations, e.g., hardware resources, computing resources, etc., may be conserved by reducing the need to place an order for new inventory because of having insufficient inventories. Furthermore, in some implementations, when a physical location is unable to timely satisfy a user's demand, techniques disclosed herein may enable the system to proactively identify alternate physical locations that are able to satisfy the demand and direct the user to those alternate physical locations.

In some implementations, the system may enable the pre-staging of orders at various times of day, and to specify details of the desired transaction, such as a particular amount of the transaction, particular sizes of subunits that satisfy the specified amount, a collection time for the transaction, or other details related to how the customer desires to conduct the in-person transaction.

When a customer conducts an in-person transaction at a physical location, the customer may specify particular requests associated with the transaction. Satisfying the customer's requests in real-time at the physical location may not always be possible, and even when possible, can result in long waiting times for the customer as well as other customers.

For example, a customer can make a request to obtain a certain amount of physical items from an account that the customer owns (or is associated with) at a commercial institution. The account may define a total quantity of physical items that are available to be obtained from the account. The account may be maintained across multiple geographic locations at which the physical items are stored, and the customer may be able to visit one or more of those locations to obtain the requested physical items.

When the customer makes a request to obtain an amount of physical items, the customer may also specify particular details for obtaining the amount of physical items. For example, the customer may specify that the quantity of physical items be provided in a particular combination of differently-sized subunits of physical items. The amount of physical items may be requested, for example, in a greater number of small subunits, or in a fewer number of large subunits, or in a mixture of small and large subunits.

However, based on the available inventory at different locations maintaining the account, the requested amount of physical items and/or the particular combination of differently-sized subunits of physical items may not be readily available at the locations. As a result, a particular location may be unable to fulfill the customer's specified requests or may be delayed in doing so. This can result in inefficiency and wasted time for both the customer, who may be forced to find another location, as well as for the commercial institution, which devotes human resources and/or technological resources that are unable to satisfy the customer's needs. In addition, this can also result in staff members at the location working in a reactive mode and spending time on low-value back-office transactions (e.g., bundling physical items into the requested combination of subunits) as opposed to high-value customer-facing transactions. This can lead to inefficiency and wasted resources.

Techniques disclosed herein may better ensure that inventories at multiple physical locations are sufficient to meet the expected demands of users. As such, resources at those locations, e.g., hardware resources, computing resources, human resources, etc., may be conserved by reducing the need to reactively place orders for new inventory because of having insufficient inventories. Furthermore, in some implementations, when a physical location is unable to timely satisfy a user's demand, techniques disclosed herein may enable the system to proactively identify alternate physical locations that would be able to satisfy the demand and direct the user to those alternate physical locations.

According to the present disclosure, techniques are provided that enable commercial institutions to forecast details of amount and types of physical items that will be requested by customers at a particular place at a particular time. The system may provide customers with the ability to pre-stage orders at various times of day, and to specify details of the desired transaction, such as a particular amount of the transaction, particular sizes of subunits that satisfy the specified amount, a collection time for the transaction, or other details related to how the customer desires to conduct the in-person transaction.

The system may enable a customer to more easily select and/or view locations that are able to fulfill the customer's particular transaction requests. In some implementations, the system may also enable the customer to specify various options for future transactions, such as a recurring schedule of transactions, favorites, or preferences. The system may also enable the customer to view a history of transactions, track current orders, or other information related to past and pending orders.

In some implementations, the system may enable a customer to designate other users who are authorized to perform transactions on an account. For example, a customer may authorize other users to obtain an amount of physical items from the account at one or more locations by using secure authorization information (e.g., a personal identification number (PIN), a fingerprint scan, etc.) that can be verified at the one or more locations. The system may also provide various additional security features, such as sending a confirmation request to an authorized supervisor before allowing another user to request or obtain an amount of physical items from an account associated with the supervisor.

In some implementations, the system may provide a user interface, such as an application available for download or a website displayed on a browser, by which a customer may interact with a backend server. For example, the user interface may be provided on a customer's mobile device, and may provide various graphical user interfaces (GUIs) that enable the customer to specify details of transaction orders, security on the account, etc.

The backend server may interface with one or more computers that manage inventory at one or more locations. For example, the backend server may interface with a computer system of one or more institutions to manage requests by customers for in-person transactions at branch locations of the various institutions. The backend server may provide the customer with information regarding availability of physical items at one or more locations, and may coordinate authorization of the customer to pick up the physical items at the locations.

The various locations may all be related to a single institution, or may be related to different institutions. The institutions may be any suitable institution from which a customer may request to obtain physical items. As an example, a customer may request to obtain physical items from an institution that manages the customer's account and inventory of physical items. In some implementations, a customer may request to obtain physical items from an institution that is owned or otherwise related to the customer. As an example, the customer may be a business owner who owns multiple store locations, and the business owner may delegate someone to obtain physical items from one of the business owner's store locations on behalf of the owner. For various types of institutions, a customer may wish to obtain physical items from one or more locations, and the system is able to determine which of those locations are able to fulfill the customer's request.

For example, when a customer arrives at a location to obtain the requested physical items, the system may enable authorization of the customer to obtain the physical items either from a human service representative or from an automated machine. As specific examples, the customer may be provided with a secure PIN, bar code, or other authorization information on the customer's mobile device that can be verified by a human service representative or by an automated device.

Implementations described herein can provide commercial institutions with visibility and foreseeability into inventory requirements, and can enable staff members to be more proactive and efficient, improving operating efficiency of commercial institutions and improving customer satisfaction.

These improvements in operational efficiency may be relevant, for example, in contexts such as branch and other banking. In such contexts, it may be desirable that the amount of currency stored at a bank branch or other location be relatively small since there are non-negligible costs and risks associated with currency storage. On the other hand, the demand for currency—including currencies having different denominations and/or currency in different jurisdictions—may vary from day-to-day in ways that are difficult to anticipate.

To accommodate such fluctuations, banking locations may maintain sufficiently large excess currency reserves, but this may be inefficient in terms of carrying cost, storage space, security measures, and other reasons. This may also cause an increased security risk. However, if insufficient currency reserves are maintained, banking locations may be unable to satisfy demand.

FIG. 1 depicts an example system 100 that can execute implementations of the present disclosure. This example illustrates a financial institution (e.g., a bank) that has one or more branch locations (e.g., branch locations 120*a*, 120*b*, 120*c*) at which a customer (e.g., customer 108) may conduct in-person transactions. When a customer conducts an in-person transaction at a branch location, the customer may specify particular details of the transaction that the customer desires. For example, a customer making an in-person withdrawal from an account at the branch location may request the withdrawal in particular denominations, such as a particular number of twenty-dollar bills, or a particular combination of twenty-dollar bills and ten-dollar bills, etc.

The example system 100 in FIG. 1 includes a computing device 102, a computing system 104 and a network 106. A user 108 can operate the computing device 102 (e.g., a mobile device), and the computing device 102 may be communicative with the computing system 104 over the network 106. The computing system 104 can include one or more computing devices 110 and one or more computer-readable storage devices 112. The example in FIG. 1 also illustrates another computing device 114 (e.g., a desktop computer) that is operated by a user 116.

The computing system 104 can be communicative with one or more branch locations, such as branch locations 120a, 120b, and 120c. The computing system 104 may communicate with the branch locations using a suitable communication protocol to transmit and receive messages through the network 106. For example, the computing system 104 may have an application programming interface (API) that provides a standard interface to multiple branch locations. The branch locations 120a, 120b, and 120c may all be operated by the same commercial institution, or may be operated by different commercial institutions. In some implementations, the computing system 104 may implement an API so that a standardized form of communication is provided between the computing system 104 and branch locations 120a, 120b, 120c of multiple different commercial institutions.

When a customer (e.g., users 108, 116) desires to perform an in-person transaction at a branch location (e.g., one or more of branch locations 120a, 120b, 120c), the computing system 104 may communicate with at least one computer that manages inventory of physical items for the branch locations. The at least one computer that manages inventory of physical items for the branch locations may be located within one or more of the branch locations 120a, 120b, 120c, or may be separate from the branch locations. The computing system 104 may transmit the customer's request to the at least one computer that manages inventory of physical items for the branch locations, determine which branch locations are able to fulfill the customer's request, and, in some implementations, provide authorization information that allows a branch location to verify that a particular user is authorized to perform the transaction.

In some implementations, the computing devices 102, 114 can be computing devices such as laptop or desktop computers, smartphones, personal digital assistants, portable media players, tablet computers, or other appropriate computing devices that can be used to communicate with an electronic social network. In some implementations, the computing devices 102, 114 perform client-side operations, as discussed in further detail herein. In some implementations, the computing system 104 can include one or more computing devices such as a computer server. In some implementations, the computing system 104 can represent more than one computing device working together to perform the server-side operations, as discussed in further detail herein. In some implementations, the network 106 can be a public communication network (e.g., the Internet, cellular data network, dialup modems over a telephone network) or a private communications network (e.g., private LAN, leased lines).

Figure 2:
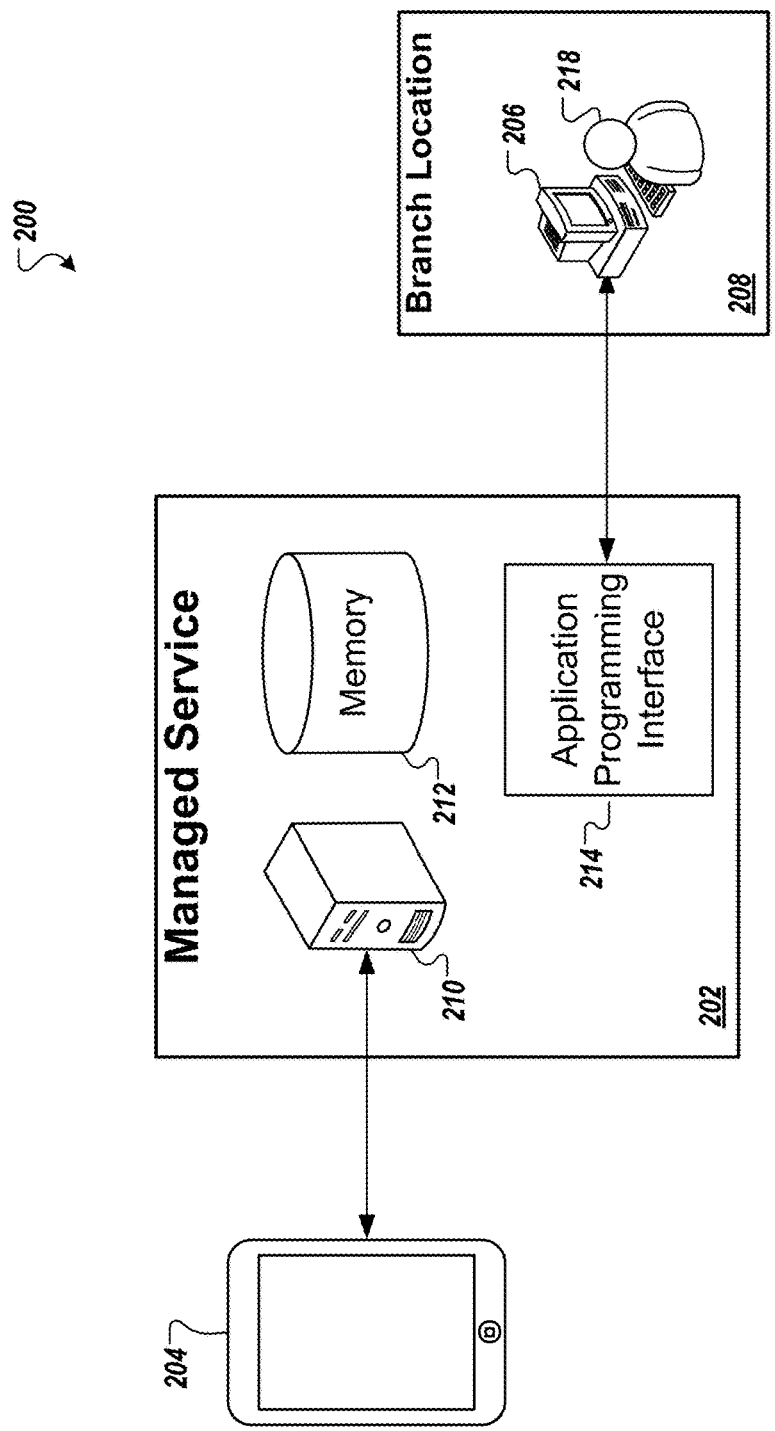
FIG. 2 is a block diagram illustrating an example of components of a system that manages requests for in-person transactions.

FIG. 2 is a block diagram illustrating an example of components of a system that manages requests for in-person transactions. In the example system 200, a managed service 202 (which can be implemented, for example, by the computing system 104 in FIG. 1) is communicative with both a device 204 (e.g., user device 108 or 116 in FIG. 1) and at least one computer 206 that manages inventory of physical items for a branch location 208 (e.g., branch locations 120a, 120b, 120c in FIG. 1). Although the example of FIG. 2 illustrates, for simplicity, the computer 206 as being located at the branch location 208, in general a computer that manages inventory of physical items for the branch location 208 (and possibly other branch locations) may be at any suitable location, and be communicative with the managed service 202.

The managed service 202 includes one or more computers 210 and a computer-readable medium, such as computer-readable memory 212. The memory 212 may implement a database, and the managed service 202 may implement a suitable database management technique, such as a structured query language (e.g., MySQL) to enable the computer 210 to access data stored in the memory 212. The managed service 202 also includes an application programming interface (API) 214 that enables the managed service 202 to communicate with the branch location's computer 206. This communication may take place, for example, according to a specified communication protocol by which messages may be transmitted between the managed service 202 and the branch location's computer 206.

FIGS. 3-11 are diagrams of examples of graphical user interfaces (GUIs) that enable management of requests to conduct in-person transactions. These examples, which are for illustrative purposes and do not necessarily limit the scope of possible implementations, are in the specific context of a customer of a financial institution (e.g., a bank) who requests withdrawal of currency from one or more branch locations of the financial institution.

Figure 3:
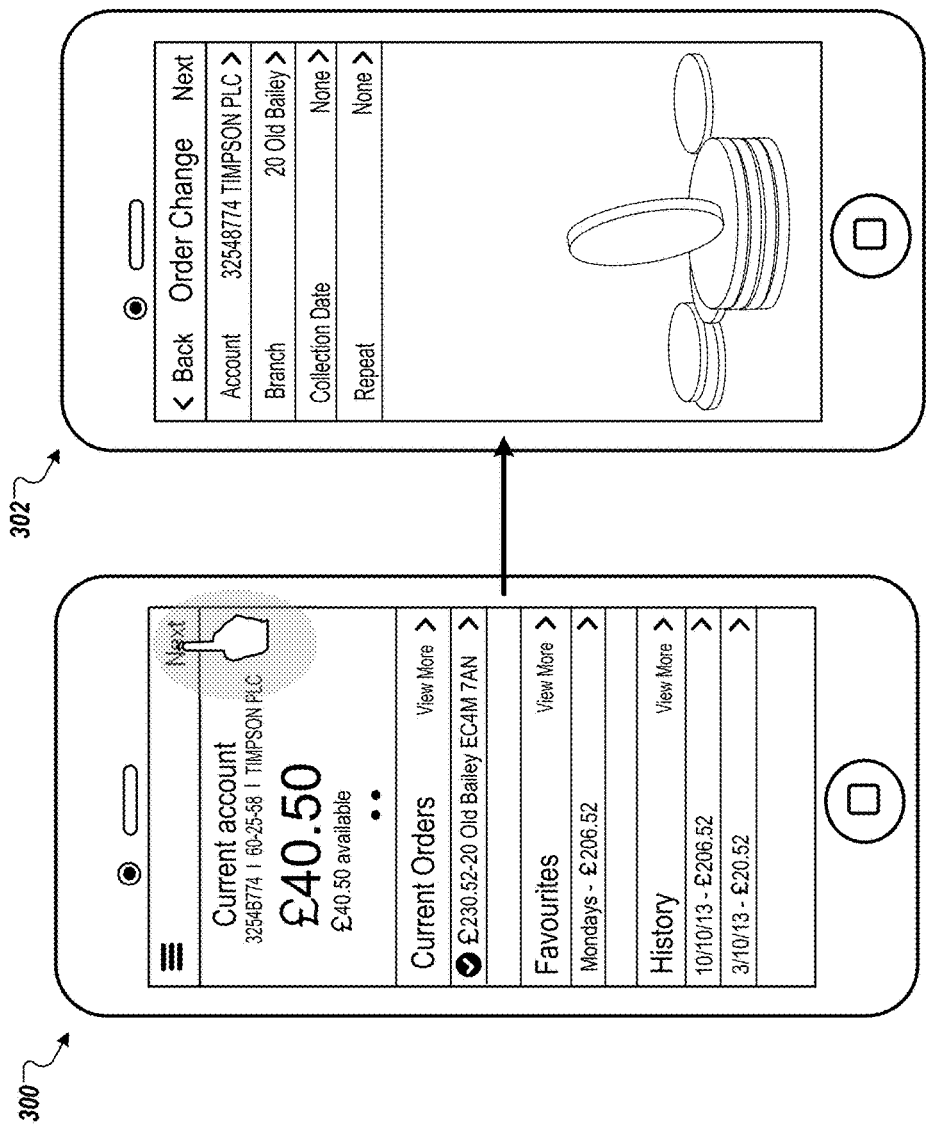
FIGS. 3-11 are diagrams illustrating examples of graphical user interfaces that allow a user to interact with a system that manages requests for in-person transactions.

Referring now to FIG. 3, an example graphical user interface 300 is illustrated that allows a user to launch an application on the user's mobile device. In this example, the user launches the application and is presented with the main screen 300 of the mobile banking application. This main screen 300 displays account information (e.g., an account number), current orders, and accounting tools.

The user can tap the "Next" button on main screen 300 to make the order on the order change screen 302. In this example, the user can select an account from which to place the order, a particular branch location at which to pick up the order, and a collection date and desired recurrence of the order. The account may be a personal account owned by the user, or a business account associated with the user, or any other account that the user is authorized to access.

Figure 4:
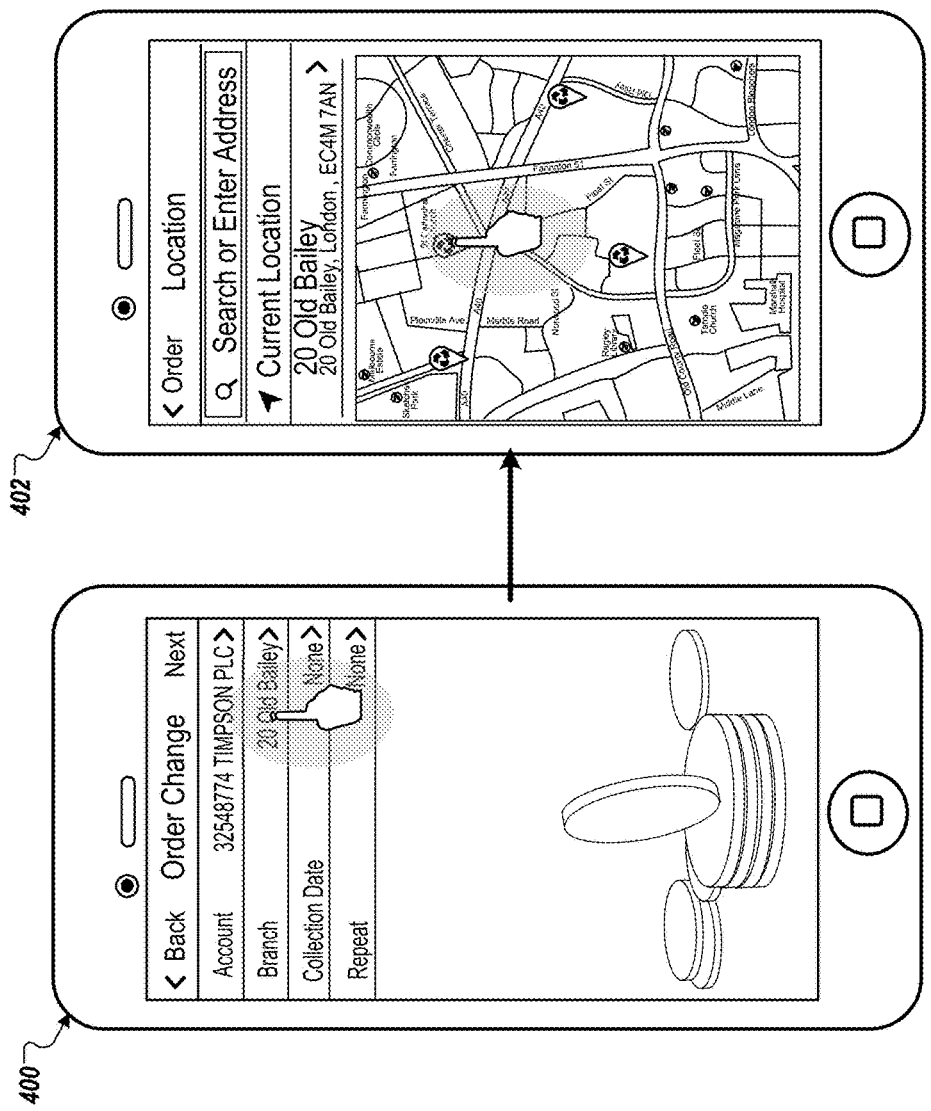

Referring now to FIG. 4, an example graphical user interface 400 is illustrated that allows a user to select a particular branch from which to perform a transaction. In this example, the application shows an order change screen 400 (e.g., order change screen 302 in the FIG. 3) that displays the user's account information and order request. By default, the application may show the branch address of the nearest location to the user. When the user clicks on the branch address in screen 400, the application displays a map-based graphical user interface (GUI) in screen 402 that shows various branch locations nearby the user. Depending on how the user's account is setup, the branches displayed in screen 402 may be for a single commercial institution, or may be branch locations for an aggregate of different institutions.

The user may select any of the displayed branch locations on the screen at 402 by, for example, tapping on an icon in the map-based GUI. Alternatively or additionally, in some implementations, the application may enable the user to search for a branch by entering a specific address. Once the user has selected a branch by interfacing with a map-based GUI or entering a specific address in screen 402, the application returns to an order change screen, as illustrated next in FIG. 5.

Figure 5:
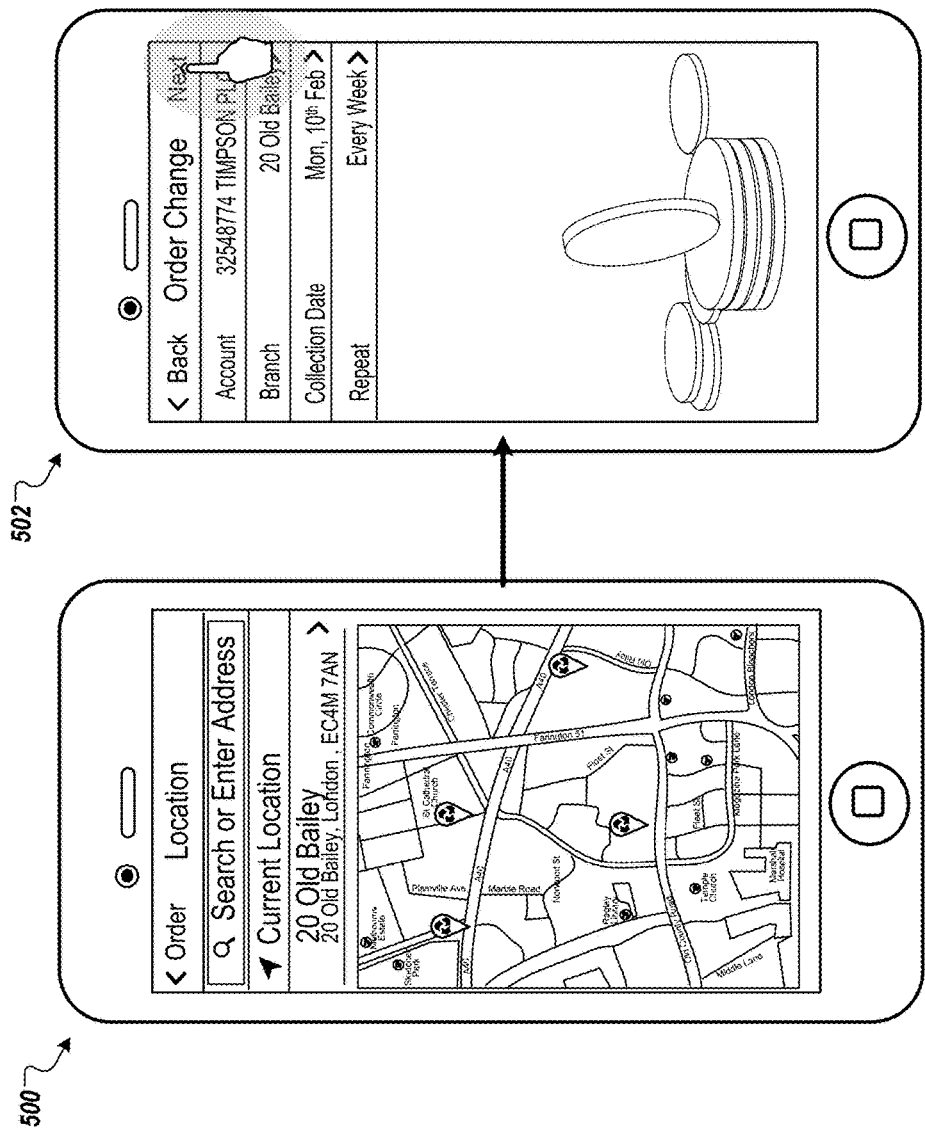

Referring now to FIG. 5, an example graphical user interface 500 is illustrated that allows a user to select a collection time and/or a recurring transaction order. In this example, once the user is satisfied with a branch location selected in screen 500 (e.g., screen 402 in FIG. 4), the application returns to the order change screen 502. The application then enables the user to select a collection date, and a recurring frequency of future transaction orders. For example, the application may enable the user to select a daily, weekly, fortnightly, or other suitable recurrence frequency for placing an order. Some implementations, the specification of the collection date and recurrence frequency may be optional in the application. The user may then click on the "Next" button in screen 502 to proceed to the next screen.

Figure 6:
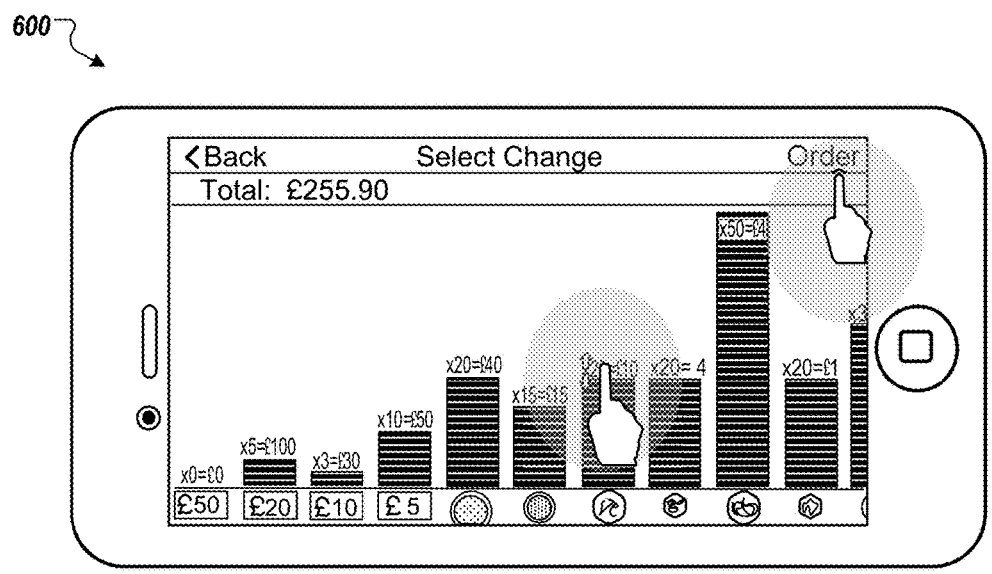

Referring now to FIG. 6, an example graphical user interface 600 is illustrated that allows a user to select quantities of different denominations for physical currency to be collected during an in-person transaction. In some implementations, the application enables the user to select individual denominations by performing gesture-based operations on a graphical user interface. In the example of FIG. 6, the application enables the user to swipe up or swipe down on the each of the column-shaped bars to increase or decrease the amount of the corresponding denomination. In some implementations, when a user swipes up (or down) on a bar, the total amount requested may increase (or decrease) accordingly. Alternatively, in some implementations, when a user swipes up (or down) on a bar, the other bars may automatically readjust to maintain the same total requested amount.

In some implementations, the application may also display subtotals for each bar, corresponding to the amount of that particular denomination. Once a user is satisfied with the selected denomination amounts, the user can click on the "Order" button on the screen 600 to continue.

Figure 7:
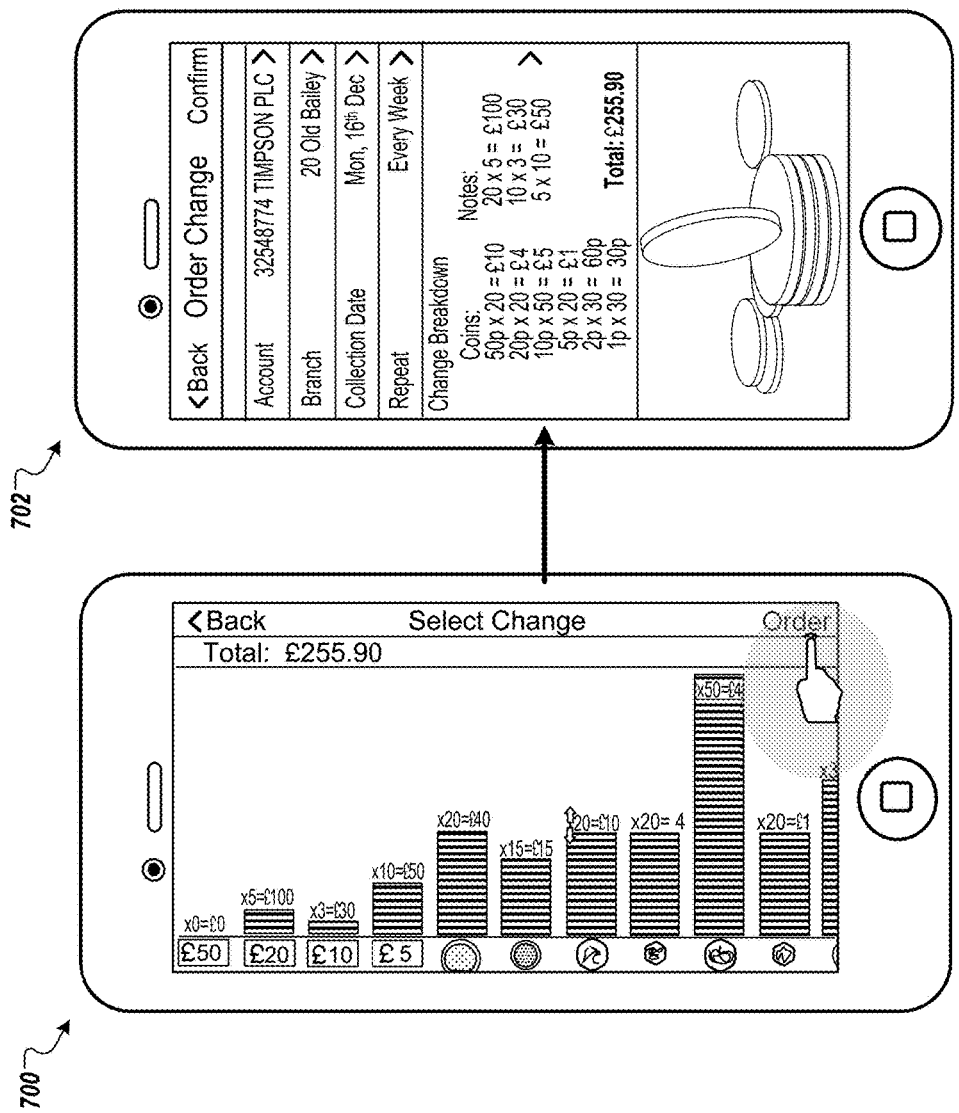

Referring now to FIG. 7, an example graphical user interface 700 is illustrated that allows a user to view an order summary page. In this example, after the user has completed selecting the amount of each denomination in screen 700 (e.g., screen 600 in FIG. 6), the application may enable the user to view a summary of the order in screen 702. In some implementations, the summary page in screen 702 may display the selected amount of the various denominations that fulfill the total requested amount. If the user is satisfied with the summary page, the application enables the user to confirm the order by pressing on the "Confirm" button on screen 702.

Figure 8:
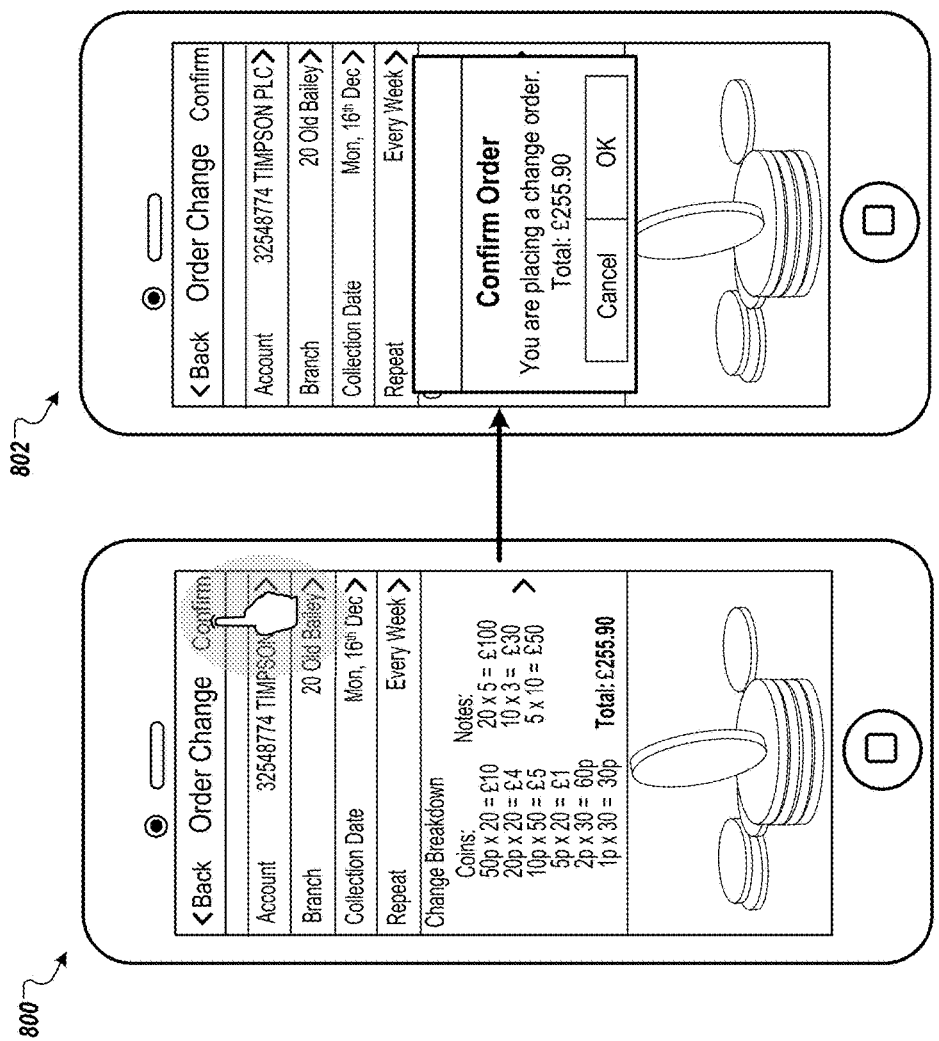

Referring now to FIG. 8, an example graphical user interface 800 is illustrated that allows a user to confirm an order. In this example, when the user clicks on the "Confirm" button in screen 800 (e.g., screen 702 in FIG. 7), the application displays screen 802 that enables the user to either confirm or cancel the order. If the user confirms the order, the application displays the next screen shown in FIG. 9.

Figure 9:
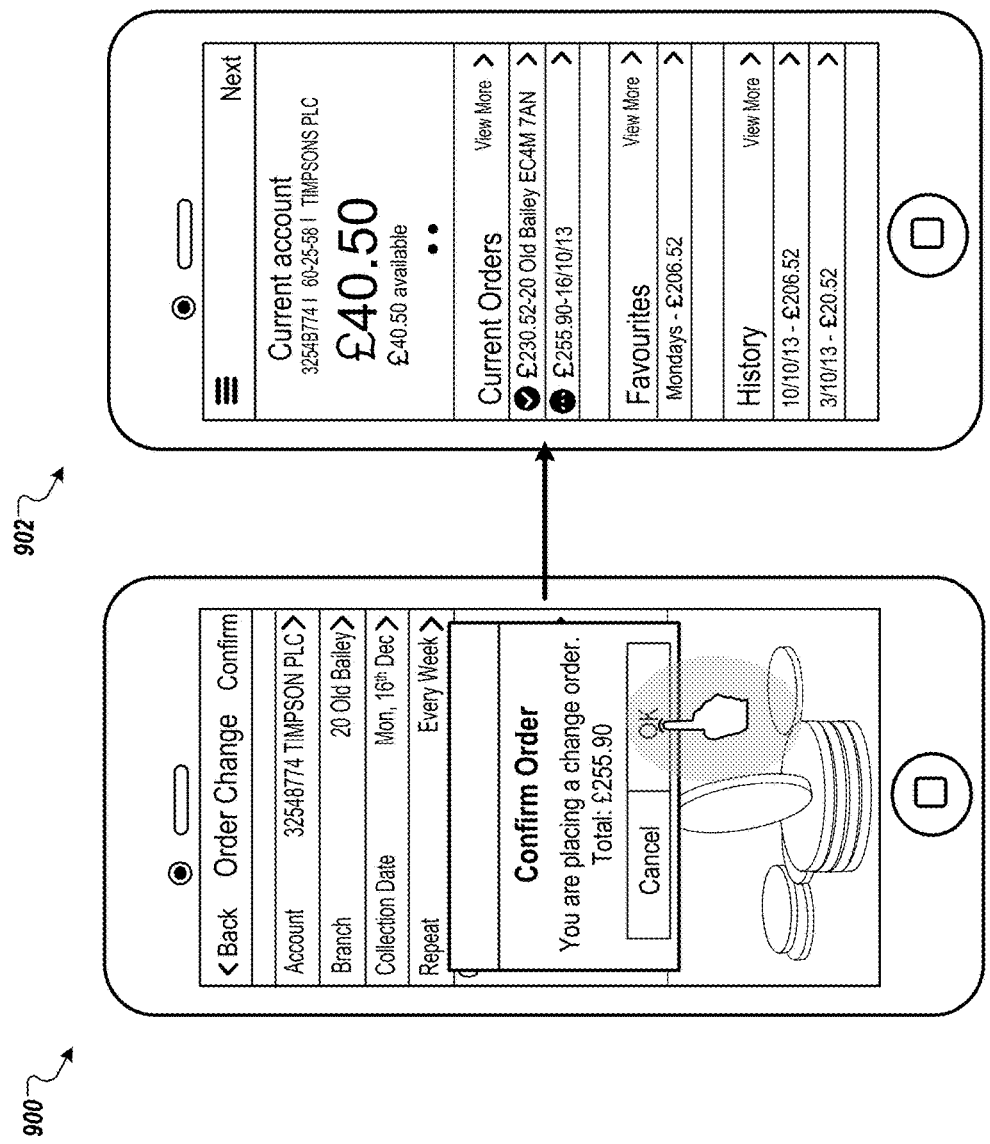

Referring now to FIG. 9, an example graphical user interface 900 is illustrated that allows a user to view an order being added to a list of current orders. In this example, after the user has clicked on the "OK" button in screen 900 (e.g., screen 802 in FIG. 8), the application displays a list of current orders in screen 902, among which the recently placed order is displayed. In some implementations, the application may provide a visual differentiation among the orders in the "Current Orders" list based on, for example, the status of the order. For example, in screen 902, a checkmark in a circle is illustrated beside the first order in the "Current Orders" list to illustrate that the order is ready for collection, while a horizontal bar in a circle is displayed next to the second order to indicate that the order is still being processed. In some implementations, when after an order has been collected, the corresponding entry from the "Current Orders" list is removed, and the entry may be, for example, archived in memory.

Figure 10:
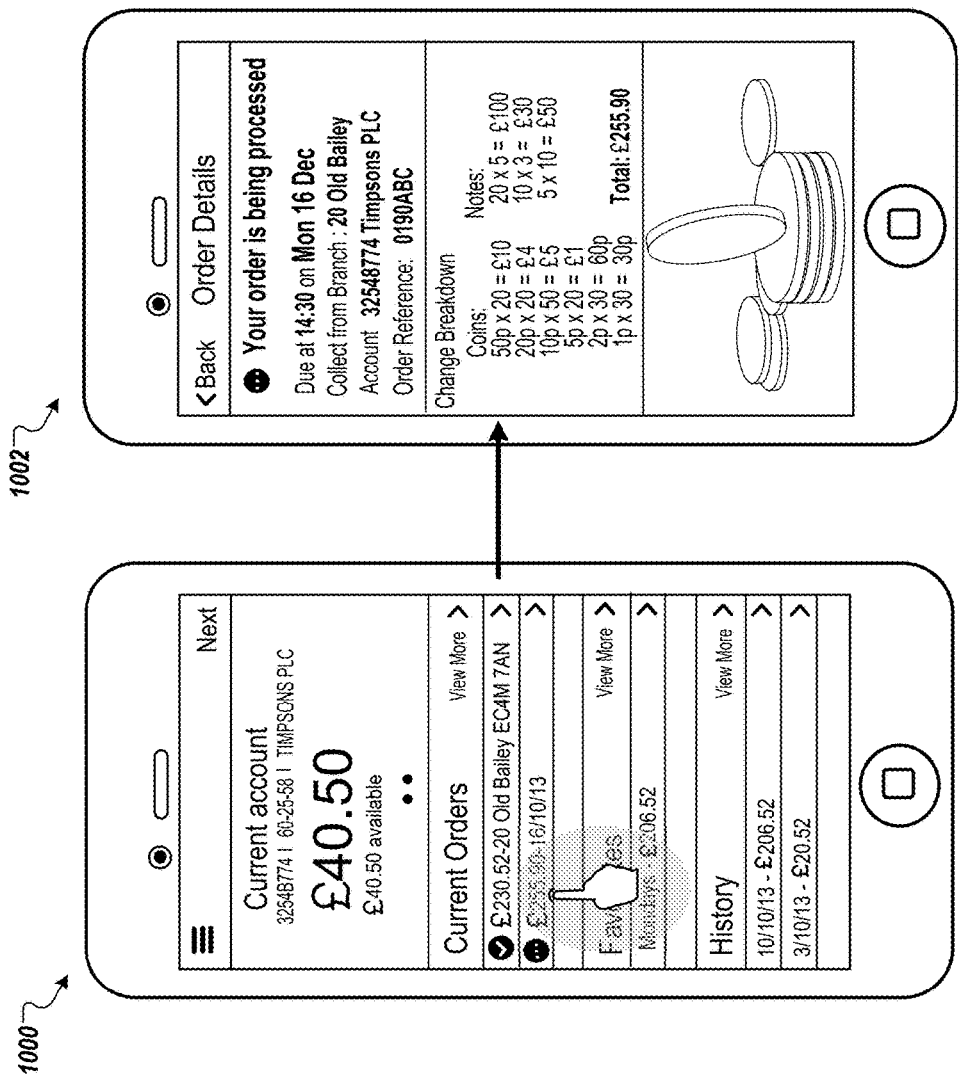

Referring now to FIG. 10, an example graphical user interface 1000 is illustrated that allows a user to view details of a pending order. In this example, when the user clicks on a pending order in screen 1000, the application displays screen 1002 with details of the order that is being processed. In particular, screen 1002 shows details including a "Due at" time that has been specified by the user for collecting the order at the location. The screen 1002 also shows a "Collect from Branch" entry with the address of the location at which the order is to be picked up. Screen 1002 also shows details of the amounts of various denominations that have been specified by the user for collecting the order.

Figure 11:
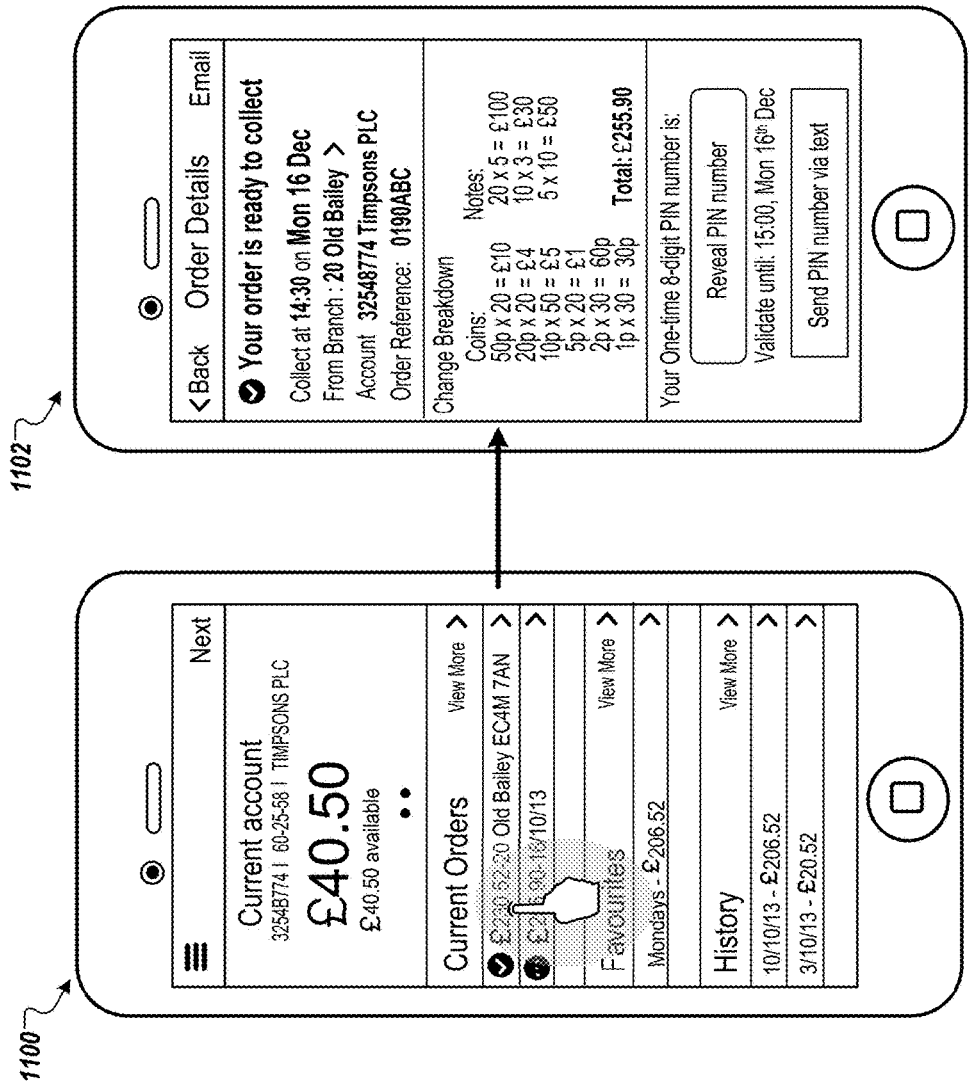

Referring now to FIG. 11, an example graphical user interface 1100 is illustrated that allows a user to user to view details of an order that is ready for collection. In this example, the user also receives authorization information that authorizes the user to complete the order during an in-person transaction at a location.

In this example, when the user selects an order from the "Current Orders" list in screen 1100 that is ready to be collected, the application displays screen 1102 that displays details of the selected order. In this example, the screen 1102 also displays authorization information that can be accessed by the user. For example, in some implementations, the user's device may have received (e.g. from the managed service 202 in FIG. 2) the authorization information. Additionally were alternatively, in some implementations, the authorization information may be generated on the user's device itself (e.g., via a fingerprint scan), or may have been received directly from the financial institution.

In the example of FIG. 11, screen 1102 displays two options for the user to obtain the authorization information, which in this case is an eight-digit PIN number. The first option is for the application to reveal the PIN number a single time, by the user clicking on the "Reveal PIN number" button. The second option in screen 1102 is for the user to click on the "Send PIN number via text" button to receive the PIN number via a text message sent to the user's device (e.g., from the managed service 202 in FIG. 2). In some implementations, the authorization information (e.g., a PIN number) may only be valid for a finite duration of time, after which the user may need to be re-authorized.

Various other implementations are possible. For example, the system may send authorization information to one or more other users who are authorized to perform the transaction in person. For example, in some implementations, a user can send the authorization information to another person who may be designated as a delegate to perform the transaction at the location. The communication of the authorization information to the other person may take place, for example, by text message, email, or other suitable form of communication. Other types of authorization information are also possible, such as a fingerprint scan, barcode, QR code, etc.

The authorization information may enable a particular branch location to verify that a person is authorized to perform a transaction on an account, such as collecting an amount of currency from the account. In the example of FIG. 11, a customer may go to a branch location and display the eight-digit PIN number on the customer's mobile device to a staff member. The staff member may also have the corresponding PIN number (e.g., by receiving it from the managed service 202 in FIG. 2) and may be able to verify that the customer is authorized. The PIN number may have been generated by the managed service (e.g., managed service 202 in FIG. 2) and sent to both the customer's device and a computer that manages inventory for the branch location. In some implementations, the PIN number may be generated by the bank's computer itself, and sent to the managed service (e.g., managed service 202 in FIG. 2), which then relays the PIN number to the customer's device.

Figure 12:
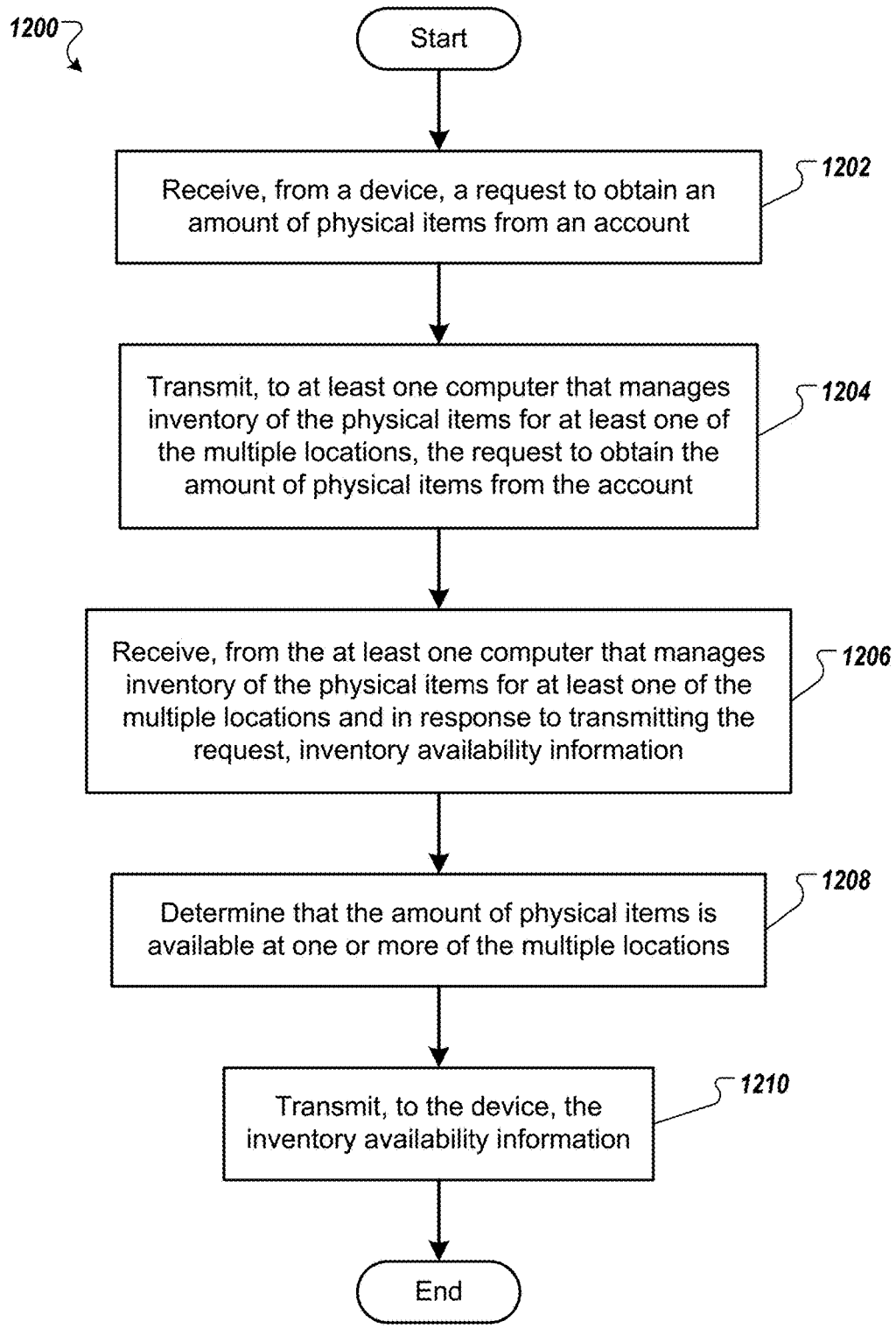
FIGS. 12-14 are flow charts illustrating examples of managing requests for in-person transactions.

Referring now to FIG. 12, a flow chart is illustrated showing an example of managing requests for conducting in-person transactions. The example process 1200 may be performed by a managed service (e.g., managed service 202 in FIG. 2) that manages requests received from customer devices (e.g., devices 104, 114 in FIG. 1, or device 204 in FIG. 2) to obtain physical items at one or more locations.

In the example process 1200, the managed service receives (in step 1202), from a device (e.g., device 204 in FIG. 2), a request to obtain an amount of physical items from an account. The account defines a total quantity of the physical items able to be obtained from the account. For example, the account may specify a balance of currency that is available for withdrawal. The account may be maintained across multiple locations at which the physical items are stored, such as multiple branch locations of a bank.

In some implementations, the request may include other information. For example, the request may include a specified time (e.g., a "Due at" time specified by the user, as shown in screen 1002 of FIG. 10) at which the amount of physical items is to be obtained from the account. The received request may be stored in a memory device and later updated based on new information to reflect an updated status of the user's order.

Based on receiving the request, the managed service transmits (in step 1204) to at least one computer that manages inventory of the physical items for at least one of the multiple locations, the request to obtain the amount of physical items from the account. In some implementations, this may include transmitting, to the at least one computer and using an application programming interface, a message that complies with a communication protocol.

The locations may be specified by the user or suggested by the managed service. In some implementations, the locations may be specified by the user and received by the managed service from the user's device. For example, the managed service may transmit, to the device, a map-based graphical user interface that displays at least the one or more of the multiple locations at which the amount of physical items is available. This may be performed in conjunction with an application downloaded on the user's device or using a website that is hosted by the managed service and displayed on a web browser on the user's device. In some implementations, the managed service may receive a text-based input from the user specifying a particular address of a location at which to pick up the order. By such techniques, or others, the managed service may receive, from the user's device, a selection of at least one location at which obtaining the amount of physical items is requested. In some implementations, the locations may be suggested by the managed service. For example, the suggested locations may be based on nearest locations to the user, which may be determined by geo-locating techniques utilized by the managed service.

The managed service then receives (in step 1206), from the at least one computer that manages inventory of the physical items for at least one of the multiple locations and in response to transmitting the request, inventory availability information. The inventory availability information may include various types of information, such as information regarding availability, at one or more of the multiple locations, of the amount of physical items.

In some implementations, the inventory availability information may also include information regarding the availability, at each of the one or more of the multiple locations, of a combination of differently-sized subunits of physical items that satisfy the requested amount. For example, the combination of differently-sized subunits of physical items may be specified by a first quantity of subunits of a first size, and a second quantity of subunits of a second size, etc. As a specific example, the combination of differently-sized subunits of physical items may correspond to quantities of various denominations of currency, such as a number of twenty-dollar bills, a number of ten-dollar bills, etc.

In some implementations, the inventory availability information may also include an indication of a time at which the amount of physical items will be available at the one or more of the multiple locations.

Based on the received inventory availability information, the corresponding request that was stored in memory may be updated to reflect availability of physical items at different locations (e.g., to show that some locations do not have the items available at all, or that some locations will have the items available at a particular future time).

Based on the inventory availability information received from the at least one computer that manages inventory of the physical items, the managed service determines (in step 1208) that one or more of the multiple locations has available the requested amount of physical items. The managed service may also determine that one or more of the multiple locations has available the requested amount of physical items in a particular combination of differently-sized subunits.

Based on determining that one or more of the multiple locations has available the requested amount of physical items, the managed service may then transmit (in step 1210), to the device, the inventory availability information. For example, in some implementations, transmitting the inventory availability information to the device includes transmitting at least one of a text message, an email, or a pop-up display that includes the inventory availability information.

In some implementations, the managed service may determine that the requested amount of physical items (and/or a requested combination of differently-sized subunits) is not available at the one or more of the multiple locations. In such a scenario, the managed service may transmit, to the device, an indication that the request cannot be fulfilled at the one or more of the multiple locations.

Figure 13:
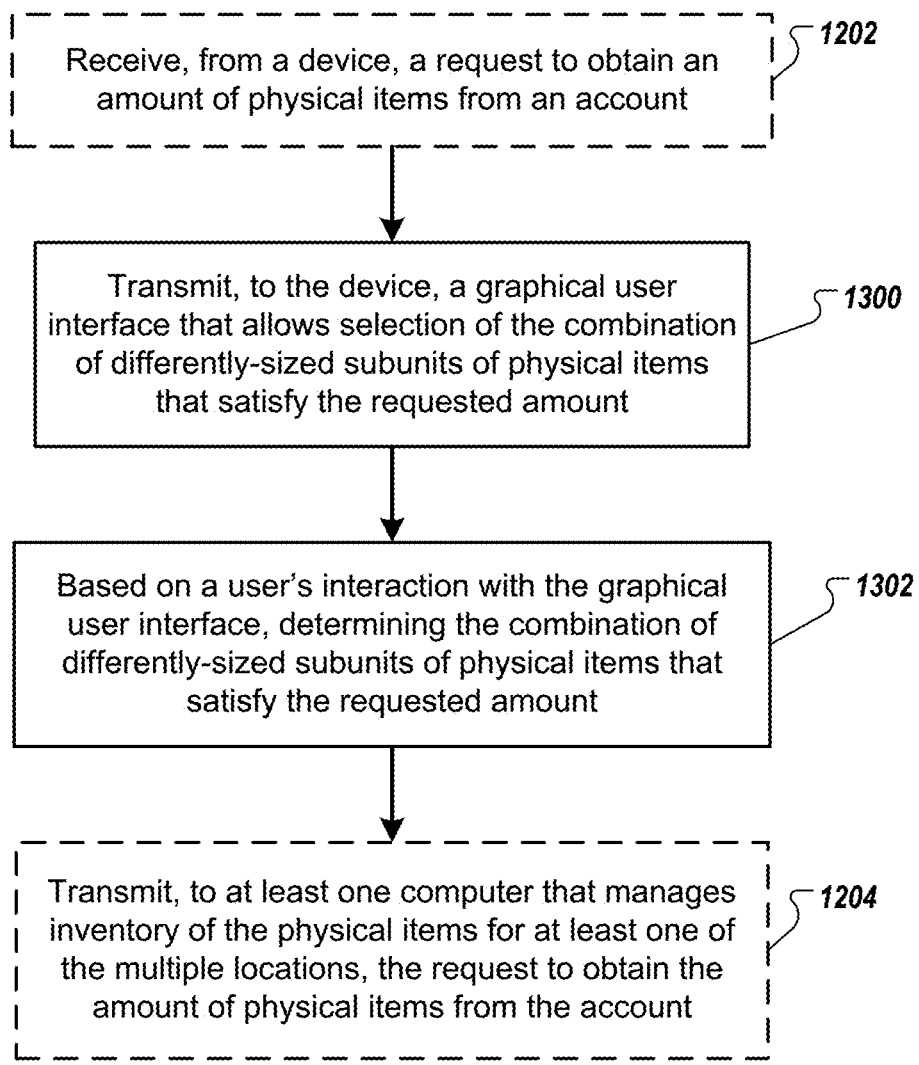

Referring now to FIG. 13, an example flow chart is illustrated showing additional details of determining a combination of differently-sized subunits of physical items that satisfy the requested amount. In some implementations, the request received from the user's device may specify, in addition to an amount of physical items, a particular combination of differently-sized subunits of physical items in which the amount of physical items is to be obtained. For example, the user may specify various denominations of currency in which to withdraw currency from an account, such as a particular number of twenty-dollar bills, a particular number of ten-dollar bills, etc. The user may specify the desired combination of subunits in any suitable manner.

For example, in FIG. 13, after the managed service receives a request from a user's device (e.g., step 1202 in FIG. 12), the managed service may transmit (in step 1300), to the user's device, a graphical user interface that allows the user to select the combination of differently-sized subunits. Based on a user's interaction with the graphical user interface, the managed service determines (in step 1302) the combination of differently-sized subunits of physical items that satisfy the requested amount.

The managed service may then include this information regarding the requested combination of subunits when it transmits the user's request to a computer that manages inventory of the physical items for at least one of the multiple locations (e.g., in step 1204 of FIG. 12).

The user may specify the combination of subunits using other techniques as well, for example, using text-based inputs, or other graphical-based user interfaces. In some implementations, the managed service itself may suggest a particular combination of subunits to the user based on, for example, available inventory at various locations.

Figure 14:
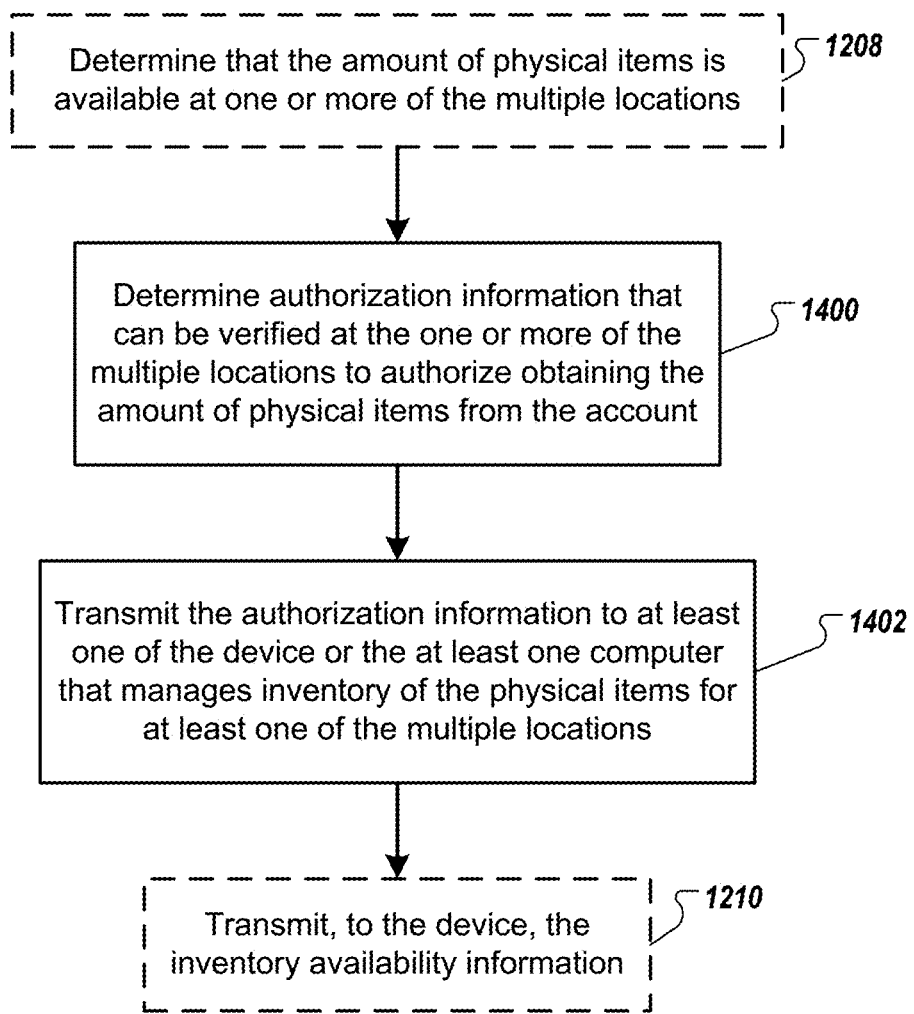

Referring now to FIG. 14, a flow chart is illustrated showing an example process for enabling authorization of user who obtains the physical items at a location. In this example, after the managed service determines that the amount of physical items is available at one or more of the multiple locations (e.g., in step 1208 of FIG. 12), the managed service determines (in step 1400) authorization information. The authorization information can be verified at the one or more of the multiple locations to authorize obtaining the amount of physical items from the account. The managed service then transmits (in step 1402) the authorization information to at least one of the device or the at least one computer that manages inventory of the physical items for at least one of the multiple locations.

In some implementations, the managed service may be configured to receive the authorization information from a computer that manages inventory of the physical items for a location, and transmit the received authorization information to the user's device. For example, the authorization information may be a bank-specified security code (e.g., utilizing a native security feature implemented by the bank's computer systems) and the managed service may transmit the bank-specified authorization information to the user's device.

In some implementations, the managed service may be configured to receive the authorization information from the user's device, and transmit the received authorization information to a computer that manages inventory of the physical items for a location. For example, the user's device may obtain a fingerprint scan of the user and transmit the fingerprint scan to the managed service, which may then relay this fingerprint scan to the bank's computer systems.

In some implementations, the managed service may be configured to itself generate the authorization information, and transmit the generated authorization information to both the user's device and a computer that manages inventory of the physical items for a location. For example, the managed service may generate a random code (or other authorization information), and transmit that code to both the user's device and the bank's computer systems, so that the user can be verified at a location by a staff member (or computing system) that can match the user's code with the bank's received code.

Other security-related features may be implemented by the managed service. For example, the managed service may be configured to maintain a list of people (e.g., received from a user or other entity) who are authorized to obtain physical items from an account. Based on this list of authorized people, the managed service may determine that a particular request specifies a person who is authorized to obtain the amount of physical items from the account, and thus provide authorization to that user.

In some implementations, the managed service may be configured to transmit, to an authorized supervisor, a confirmation of approval for a request to obtain physical currency from an account. For example, a supervisor at a company may be asked to confirm that another employee is authorized to request withdrawal of currency from an account at a branch location. Based on the supervisor's approval, the managed service may provide authorization to the other employee.

In some implementations, the managed service may be configured to refer to one or more pre-specified rules to determine whether a particular request is authorized. For example, an authorized user may specify rules related to a maximum amount of withdrawal from an account, a frequency of withdrawals, or geographic constraints in which withdrawals are authorized, or other rules. The managed service may store these rules and refer to the rules before authorizing a particular request.

In some implementations, the managed service may be configured to detect unusual activity and alert an appropriate entity. The unusual activity may indicate fraudulent activity, or erroneous activity (either human error or machine error), or other types of activity that deviate from expected or normal activity. In some implementations, the managed service may determine expected or normal activity based on pre-specified rules or based on tracking historical order data. For example, an authorized user may have specified a set of rules (e.g., maximum amount of withdrawal, maximum frequency of withdrawal, etc.) and the managed service may access those rules to determine whether a request indicates unusual activity (e.g., if a request violates a rule or if a sequence of requests consistently come close to violating the rules). As another example, in addition or as an alternative to pre-specified rules, the managed service may track historical orders to determine an expected or normal pattern of activity. As a specific example, the managed service may determine empirical averages (e.g., expected value, standard deviations, etc.) of amounts, frequencies, or other characteristics of orders, and compare a request with those empirical averages to determine if the request deviates significantly and may be considered unusual activity.

In some implementations, the managed service may detect that a request to obtain physical items from an account indicates unusual activity and may send alert information regarding the detected unusual activity to at least one of an authorized supervisor or a computer that manages inventory of the physical items for a location.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be realized in digital electronic circuitry, or in computer software, firmware, or hardware, including the structures disclosed in this specification and their structural equivalents, or in combinations of one or more of them. Implementations may be provided using one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be provided on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be provided in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be provided in combination in a single implementation. Conversely, various features that are described in the context of a single implementation may also be provided in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method using one or more processors, the method comprising:
   receiving, from a requesting device, a request to receive an amount of currency as physical items, the request identifying an account that is authorized to receive up to a total amount of currency from at least one of multiple locations where the physical items are stored, wherein the request indicates the amount as a plurality of sets of subunits of the physical items that have different denominations of the currency;

based on receiving the request:
  transmitting an inventory availability request to at least one inventory management computer that manages inventory of the physical items for at least one of the locations, and
  receiving, from the at least one inventory management computer and in response to transmitting the inventory availability request, inventory availability information that describes
    an availability, at one or more of the locations, of the amount of currency that includes the requested plurality of sets of subunits of the physical items in the different denominations; and based on the inventory availability information indicating that the amount of currency is available at the one or more locations, in the requested plurality of sets of subunits, transmitting at least a portion of the inventory availability information to the requesting device to indicate the availability, at the one or more locations, of the amount of currency in the requested plurality of sets of subunits.

2. The method of claim 1, wherein the request received from the requesting device further specifies that the amount of currency is to be drawn from the account.

3. The method of claim 2, further comprising:
transmitting, to the requesting device, a graphical user interface that allows selection of the sets of subunits of physical items that total requested amount; and
based on interaction with the graphical user interface, determining the plurality of sets of subunits of the physical items to be requested.

4. The method of claim 1, further comprising:
based on the inventory availability information indicating that the amount of currency is available at the one or more locations,
  determining authorization information that can be verified at the one or more locations to authorize obtaining at least a portion of the amount of currency from the one or more locations; and
  transmitting the authorization information to one or more of the requesting device and the at least one computer that manages inventory of the physical items for at least one of the locations.

5. The method of claim 4, further comprising:
receiving the authorization information from the at least one inventory management computer; and
transmitting the received authorization information to the requesting device.

6. The method of claim 4, further comprising:
receiving the authorization information from the requesting device; and
transmitting the received authorization information to the at least one computer that manages inventory of the physical items for at least one of the locations.

7. The method of claim 4, further comprising:
generating the authorization information; and
transmitting the generated authorization information to both the requesting device and the at least one computer that manages inventory of the physical items for at least one of the locations.

8. The method of claim 6, wherein the authorization information comprises a fingerprint scan.

9. The method of claim 7, wherein the authorization information comprises a personal identification number (PIN).

10. The method of claim 1, further comprising:
transmitting, to the requesting device, a map-based graphical user interface that displays at least the one or more of the locations where the amount of currency is available in the requested plurality of sets of subunits of physical items; and
receiving, from the requesting device, a selection of a particular location at which obtaining at least a portion of the amount of currency is requested.

11. The method of claim 1, wherein the request further indicates a time period during which the amount currency is to be retrieved from the one or more locations.

12. The method of claim 1, wherein transmitting the request to the at least one inventory management computer further comprises:
transmitting, to the at least one inventory management computer and using an application programming interface, a message that complies with a communication protocol.

13. The method of claim 1, further comprising:
storing the received request in a memory device; and
updating the stored request based on the inventory availability information.

14. The method of claim 1, wherein receiving the inventory availability information comprises:
receiving, from the at least one inventory management computer, a time period during which at least a portion of the amount of currency is available at the one or more locations.

15. The method of claim 1, wherein transmitting, to the requesting device, at least a portion of the inventory availability information comprises:
transmitting, to the requesting device, one or more of a text message, an email, and a pop-up display that includes the transmitted inventory availability information.

16. The method of claim 1, further comprising:
based on determining that the amount of currency is not available at one or more of the locations, transmitting, to the requesting device, an indication that the request cannot be fulfilled at one or more of the multiple locations.

17. The method of claim 1, further comprising:
receiving a list of people who are authorized to retrieve the amount of currency; and
based on the list of people, determining that the request specifies a person who is authorized to retrieve the amount of currency.

18. The method of claim 1, further comprising:
transmitting, to an authorized supervisor, a confirmation of approval for the request to obtain the amount of currency.

19. The method of claim 1, further comprising:
detecting that the request is associated with unusual activity; and
sending alert information regarding the detected unusual activity to at least one of an authorized supervisor or the at least one inventory management computer.

20. The method of claim 19, wherein detecting that the request is associated with unusual activity comprises:
accessing one or more rules that have been specified for authorized obtainment of currency.

21. A system comprising: one or more computers; and
a non-transitory computer-readable medium coupled to the one or more computers having instructions stored thereon which, when executed by the one or more computers, cause the one or more computers to perform operations comprising:
receiving, from a requesting device, a request to receive an amount of currency as physical items, the request identifying an account that is authorized to receive up to a total amount of currency from at least one of multiple locations where the physical items are stored, wherein the request indicates the amount as a plurality of sets of subunits of the physical items that have different denominations of the currency;
based on receiving the request:
transmitting an inventory availability request to at least one inventory management computer that manages inventory of the physical items for at least one of the locations, and
receiving, from the at least one inventory management computer and in response to transmitting the inventory availability request, inventory availability information that describes
an availability, at one or more of the locations, of the amount of currency that includes the requested plurality of sets of subunits of the physical items in the different denominations; and
based on the inventory availability information indicating that the amount of currency is available at the one or more locations, in the requested plurality of sets of subunits, transmitting at least a portion of the inventory availability information to the requesting device to indicate the availability, at the one or more locations, of the amount of currency in the requested plurality of sets of subunits.

22. A non-transitory computer storage medium encoded with a computer program, the computer program comprising instructions that when executed by one or more processors cause the one or more processors to perform operations comprising:
receiving, from a requesting device, a request to receive an amount of currency as physical items, the request identifying an account that is authorized to receive up to a total amount of currency from at least one of multiple locations where the physical items are stored, wherein the request indicates the amount as a plurality of sets of subunits of the physical items that have different denominations of the currency;
based on receiving the request:
transmitting an inventory availability request to at least one inventory management computer that manages inventory of the physical items for at least one of the locations, and
receiving, from the at least one inventory management computer and in response to transmitting the inventory availability request, inventory availability information that describes
an availability, one or more of the locations, of the amount of currency that includes the requested plurality of sets of subunits of the physical items in the different denominations; and
based on the inventory availability information indicating that the amount of currency is available at the one or more locations, in the requested plurality of sets of subunits, transmitting at least a portion of the inventory availability information to the requesting device to indicate the availability, at the one or more locations, of the amount of currency in the requested plurality of sets of subunits.

* * * * *

UNITED STATES PATENT AND TRADEMARK OFFICE
CERTIFICATE OF CORRECTION

| | | |
|---|---|---|
| PATENT NO. | : 9,996,817 B2 | Page 1 of 1 |
| APPLICATION NO. | : 14/838516 | |
| DATED | : June 12, 2018 | |
| INVENTOR(S) | : Adrija Biswas and David De Niese | |

It is certified that error appears in the above-identified patent and that said Letters Patent is hereby corrected as shown below:

In the Claims

Column 18, Line 44, in Claim 16, after "the" insert -- multiple --.

Column 20, Line 23, in Claim 22, after "availability," insert -- at --.

Signed and Sealed this
Thirtieth Day of April, 2019

Andrei Iancu
*Director of the United States Patent and Trademark Office*